(12) United States Patent
Shanker et al.

(10) Patent No.: US 7,974,613 B1
(45) Date of Patent: Jul. 5, 2011

(54) DEVICE CAPABILITY DETERMINATION FOR A MOBILE DEVICE

(75) Inventors: Uma Shanker, Laguna Niguel, CA (US); Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 712 days.

(21) Appl. No.: 11/707,505

(22) Filed: Feb. 16, 2007

Related U.S. Application Data (63) Continuation-in-part of application No. 10/868,050, filed on Jun. 15, 2004, now Pat. No. 7,584,466.

(60) Provisional application No. 60/478,871, filed on Jun. 16, 2003, provisional application No. 60/479,268, filed on Jun. 18, 2003.

(51) Int. Cl.
*H04M 3/00* (2006.01)

(52) U.S. Cl. ........ 455/419; 455/418; 455/420; 455/423; 717/168; 717/174

(58) Field of Classification Search .......... 455/418–420, 455/423–425, 432.2, 432.3
See application file for complete search history.

(56) References Cited

U.S. PATENT DOCUMENTS

| | | | | |
|---|---|---|---|---|
| 7,242,929 | B2 * | 7/2007 | Draluk et al. | 455/419 |
| 7,269,821 | B2 * | 9/2007 | Sahinoja et al. | 717/106 |
| 7,493,128 | B2 * | 2/2009 | Tang et al. | 455/466 |
| 7,584,466 | B1 * | 9/2009 | Rao | 717/168 |
| 7,784,065 | B2 * | 8/2010 | Polivy et al. | 719/328 |
| 7,873,714 | B2 * | 1/2011 | Kaappa et al. | 709/223 |
| 2002/0123335 | A1 * | 9/2002 | Luna et al. | 455/419 |
| 2003/0103484 | A1 * | 6/2003 | Oommen et al. | 370/338 |
| 2004/0043788 | A1 * | 3/2004 | Mittal | 455/558 |
| 2004/0049609 | A1 * | 3/2004 | Simonson et al. | 710/8 |
| 2005/0033829 | A1 * | 2/2005 | Oommen | 709/220 |
| 2005/0227683 | A1 * | 10/2005 | Draluk et al. | 455/419 |
| 2005/0234967 | A1 * | 10/2005 | Draluk et al. | 707/102 |
| 2005/0282533 | A1 * | 12/2005 | Draluk et al. | 455/418 |
| 2006/0015626 | A1 * | 1/2006 | Hallamaa et al. | 709/229 |
| 2006/0020947 | A1 * | 1/2006 | Hallamaa et al. | 719/317 |
| 2006/0031449 | A1 * | 2/2006 | Hallamaa et al. | 709/223 |
| 2006/0129414 | A1 * | 6/2006 | Hallamaa et al. | 705/1 |
| 2006/0200814 | A1 * | 9/2006 | Kontinen et al. | 717/168 |
| 2006/0203722 | A1 * | 9/2006 | Oommen | 370/229 |
| 2006/0217111 | A1 * | 9/2006 | Marolia et al. | 455/418 |
| 2007/0049265 | A1 * | 3/2007 | Kaimal et al. | 455/423 |

OTHER PUBLICATIONS

Open Mobile Alliance, OMA Device Management Tree and Description_ver 1.2, Jun. 15, 2005 (OMA-TS-DM-TND-V1_2-20050615-C).*

Open Mobile Alliance, Firmware Update Management Object, OMA-DM-V0_14-20040ct28-D.*

* cited by examiner

*Primary Examiner* — Kent Chang
*Assistant Examiner* — Magdi Elhag (57) ABSTRACT

A device management (DM) technique wherein management objects (MOs) with device capability information are created and used for each feature domain or application. Each application installed in a mobile electronic device such as, for example, a cellular phone, a personal digital assistant, or a pager may provide device capability information that is stored as a management object or sub-node of a standard device management object, such as sub-nodes of the "DevDetail" management object in a DM tree in a mobile device compatible with the Open Mobile Alliance (OMA) Device Management (DM) specification, for example. The device capability information may be retrieved, for example, by a DM server or a customer care server in the form of extensible markup language (XML) data or an OMA UAProf-based device profile, to name only two possible forms.

42 Claims, 3 Drawing Sheets

DEVICE CAPABILITY DETERMINATION FOR A MOBILE DEVICE

CROSS-REFERENCE TO RELATED APPLICATIONS

This application is a continuation in part of U.S. patent application Ser. No. 10/868,050, entitled "Management Tree Management In A Mobile Handset," filed Jun. 15, 2004, now U.S. Pat. No. 7,584,466, which claims priority to Provisional application No. 60/478,871, filed on Jun. 16, 2003, and to Provisional application No. 60/479,268, filed on Jun. 18, 2003.

RELATED APPLICATIONS

The present application makes reference to, claims priority to, and claims benefit of U.S. Provisional Application Ser. No. 60/774,989 entitled "Device Capability Determination For A Mobile Device", filed Feb. 16, 2006, the complete subject matter of which is hereby incorporated herein by reference, in its entirety.

The present application also makes reference to U.S. Patent Application Ser. No. 60/664,249 entitled "Device Client Specification", filed on Mar. 21, 2005, the complete subject matter of which is hereby incorporated herein by reference, in its entirety.

In addition, this application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information", filed Nov. 19, 2001, and having publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices such as, for example, mobile phones and personal digital assistants (PDA's), often contain firmware and application software that are either provided by the manufacturers of the electronic devices, by telecommunication carriers, or by third parties. If firmware or firmware components are to be changed in such electronic devices, it is often very tricky to update the firmware or firmware components.

It is often difficult to determine what is wrong with an electronic device when a problem is encountered. Quite often, a customer care representative for a system operator does not have answers to a customer's problem and is not able to fix it. Determination of problems with a customer's mobile device is a big problem for system operators. Answering customer care calls is quite expensive. Especially so, if at the end of such a call, the customer care representative is unable to determine what is wrong with the electronic device.

Different electronic devices have different sets of resources, different sets of parameters, etc. Managing mobile devices in a heterogeneous communication network is a huge problem. Figuring out what parameters need to be set is also a problem.

Device profile evolution (DPE) techniques do not exist yet, although feeble attempts may have been made in the form of extending existing UAProf techniques to include some support for device parameter adjustments based on content to be delivered to a device. Recently, the Open Mobile Alliance (OMA), that supports the UAProf techniques, has begun exploring the need to support device profile evolution (DPE), and some use-cases have been discussed to determine its need.

However, since an electronic device can undergo a firmware update (or software update) and acquire new capabilities, a mechanism is needed that addresses the determination of new capabilities and the detection of new capabilities, from an external server as well as by a user of the electronic device. The OMA UAProf technique of sending user agent information to a wireless application protocol (WAP) server or WAP gateway does not seem to address that. UAProf and the proposed OMA DPE work address sending user agent properties to address temporary needs of an application or service being (or about to be) consumed. However, they do not support determination or communication of information on features added to the electronic device that have a long term impact such as, for example, that due to firmware updates, etc. DPE has been proposed (and is not yet a reality) to support device-specific rendering, and device-specific delivery of content, based on parameters related to some device capability. In addition DPE seems to support a narrow set of use-cases related to (mostly temporary) changes to electronic device settings in order to make it possible to consume a service.

UAProf and the proposed DPE do not provide any help regarding the support for an optional feature for an OMA enabler implementation. For example, if an electronic device supports firmware update capability, then it must be possible to determine whether the device is capable of that feature/enabler implementation. However, this determination is not possible with UAProf based technique and even the proposed work of DPE, which is likely to be delivered as a specification in 2007 or beyond.

The features (such as OMA enablers) supported by an electronic device need to be supported, and UAProf based technique currently does not support that. In addition, if however, an optional sub-feature such as, for example, client-initiated firmware update (e.g., for a feature called "firmware update") is not supported by a device, this needs to be determined too (ideally). However, neither UAProf based technique nor the proposed DPE support such determination.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A device, method and system supporting management of device capability information in a plurality of mobile electronic devices, substantially as shown in and/or described, in connection with at least one of the figures, as set forth more completely in the claims.

These and other advantages and novel features of the present invention, as well as details of an illustrated embodiment thereof will be more fully understood from the following description and drawings.

DETAILED DESCRIPTION OF THE INVENTION

Aspects of the present invention may be found in a method for remotely determining and configuring device management parameters in mobile electronic devices. More specifically, aspects of the present invention may be found in a method of managing device capability information in a mobile/handheld electronic device such as, for example, a mobile handset, a cellular phone, a personal digital assistant, a pager, a personal computer, or any of a number of other portable or handheld electronic devices with communication functionality. Device capability information may, for example, store indications of whether applications/features in a mobile electronic device are enabled/disabled, which and how much of the resources of the electronic device are used by an application/feature, and whether an application/feature is a standard application/feature. Although much of the following discussion relates to a mobile handset or mobile device such as a cellular phone, the teachings of the present invention also apply to any of a wide variety of electronic devices with wired or wireless communication functionality that provide subscriber access to communication services such as, for example, those named above, and other electronic devices having similar characteristics.

Figure 1:
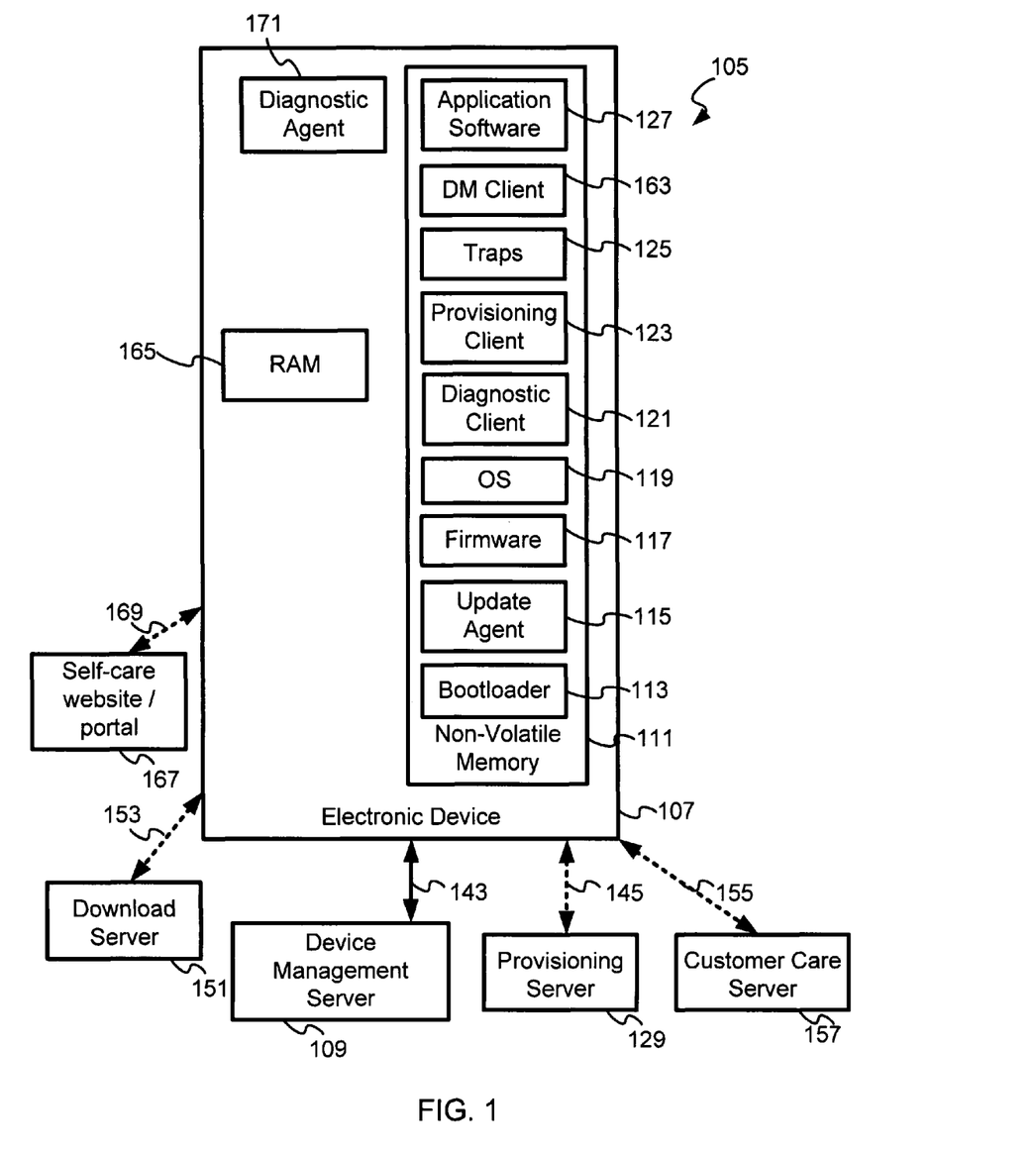
FIG. 1 is a perspective block diagram of an exemplary mobile network that supports the determination of device capability information of a mobile device, in accordance with a representative embodiment of the present invention.

FIG. 1 is a perspective block diagram of an exemplary mobile network 105 that supports the determination of device capability information of a mobile device 107, in accordance with a representative embodiment of the present invention. The mobile device 107 of FIG. 1 may comprise, for example, a mobile handset or cellular phone that may support a wide variety of features. The mobile device 107 may, for example, permit applications to be downloaded and installed on the mobile device 107, from a device such as, for example, the download server 151. In one representative embodiment of the present invention, the mobile device 107 may be used by a customer to request customer care service via a customer care server 157. Device capability information from the mobile device 107 may be one of the parameters provided. In a representative embodiment of the present invention, a customer service representative (CSR) may provide a service to the customer using the mobile device 107, after device capability information is retrieved from the mobile device 107. This retrieval of device capability information makes it unnecessary for a customer to provide such information to a CSR.

A mobile network in accordance with a representative embodiment of the present invention, such as the mobile network 105 of FIG. 1, is capable of supporting customer care calls by the customer/subscriber of an electronic device such as the mobile device 107, who may be having a problem with the mobile device 107, and who needs help in diagnosing the problem and in finding an appropriate solution. In a representative embodiment of the present invention, diagnosis of a problem and determination of an appropriate solution in an electronic device such as, for example, the mobile device 107 of FIG. 1, may be based on device capability information retrieved from the mobile device 107.

A mobile network in accordance with the present invention such as, for example, the mobile network 105 shown in the illustration of FIG. 1, may comprise the mobile device 107, the customer care server 157, a device management (DM) server 109, a download server 151, a provisioning server 129, and a self-care website/portal 167. Although these network elements are shown in the example of FIG. 1 as individual entities, this is for reasons of illustration and clarity, and does not represent a specific limitation of the present invention. Any or all of these network server elements may be co-resident, in any combination, on one or more servers without departing from the spirit and scope of the present invention.

As shown in FIG. 1, the mobile device 107 is communicatively linked to the customer care server 157, the device management (DM) server 109, the download server 151, the provisioning server 129, and the self-care website/portal 167 via respective communication links 155, 143, 153, 145, and 169. The communication links 155, 143, 153, 145, and 169 may comprise any of a number of types of wired or wireless links such as, for example, a wireless cellular network, a wireless paging network, and wired networks such a public switched telephone network, a packet network, a private network, and the Internet. Although not shown in FIG. 1, one of skill in the art will recognize upon reading this disclosure that the individual communication links 155, 143, 153, 145, and 169 may, in fact, comprise a single wireless path supporting communication with the mobile device 107.

In a representative embodiment of the present invention, the mobile device 107 may, for example, comprise a non-volatile memory 111, and a random access memory (read/write memory) RAM 165. The non-volatile memory 111 may, for example, comprise flash-type memory, and may contain application software 127, a DM client 163, a traps client 125, a provisioning client 123, a diagnostic client 121, an operating system (OS) 119, firmware 117, update agent(s) 115, and a boot loader 113. In a representative embodiment of the present invention, a DM client such as the DM client 163 may received DM commands from a DM server such as the DM server 109, and may interact with a provisioning client such as the provisioning client 123 to implement the received DM commands. The DM commands may be, for example, those in accordance with an Open Mobile Alliance (OMA) Device Management (DM) Version 1.2 or later protocol, as developed under the sponsorship of the Open Mobile Alliance, Ltd.

A representative embodiment of the present invention may comprise a traps client such as the traps client 125, that may facilitate setting traps and retrieving collected information. Diagnostics firmware such as, for example, the diagnostic client 121 may act to facilitate remote diagnosis of the mobile device 107. Update agent firmware such as the update agent(s) 115 may enable the updating of firmware, software and configuration information in the mobile device 107, and may be employed to update, for example, application software 127, operating system (OS) 119, or firmware 117 in the mobile device 107. The update agent(s) 115 may employ an update package delivered by, for example, the download server 151, which is used to download firmware and software updates to mobile devices in the mobile network 105. The mobile device 107 in a representative embodiment of the present invention is capable of applying the received updates using one or more update agents 115 that are each capable of processing update packages or subsets thereof.

A mobile device in accordance with the present invention may also receive provisioning information from, for example, a customer care server such as the customer care server 157, or a provisioning server such as the provisioning server 129. A provisioning client such as, for example, the provisioning client 123 may process the received provisioning information to correct configuration problems or to reconfigure software and hardware of the mobile device 107. Device capability information stored in non-volatile memory 111 of the mobile device 107 may be modified as necessary when this occurs.

A representative embodiment of the present invention supports a device management (DM) approach wherein management objects (MOs) are created and used for each feature domain or application. In such an arrangement, the MOs comprise associated device capability information. Each application installed in the mobile device 107 may provide device capability information that is stored as a MO or as sub-nodes of a standards-defined management object. For example, in a representative embodiment of the present invention, device capability information may be stored as sub-nodes of the "DevDetail" MO in a DM tree in an electronic device such as the mobile device 107 of FIG. 1. When stored in this manner, such device capability information may be retrieved by, for example, a device management server such as the DM server 109 or a customer care server such as the customer care server 157, in the form of extensible markup language (XML) data, or an OMA UAProf based device profile, for example.

In a representative embodiment of the present invention, when an application is installed on the mobile device 107 by, for example, a user or server, an entry may be created for it in a device management tree under a device management object such as, for example, the OMA DM "DevDetail" management object. This entry in the DM tree may provide for optional features that may be enabled/disabled. If the electronic device (e.g., mobile device 107) supports firmware updates and the firmware update management object (FUMO) features, software updates and the software component management object (SCOMO) features, or other types of device management features of a DM protocol such as the OMA DM protocol, then entries may be made (or sub-nodes may be provided) under a device management object such as the OMA "DevDetail" MO, to indicate the availability of the FUMO (firmware update management object) Capability, the SCOMO (Software Component management object) Capability, or other device capabilities, for example.

Through the use of a representative embodiment of the present invention, system operators/service providers of mobile networks such as, for example, the mobile network 105 may enable/disable device capabilities as needed. For example, even if the mobile device 107 is enabled to support all features of an installed application, the system operator may disable (e.g., either temporarily or permanently) some of the features, through the use of device capability management objects such as the exemplary device capability management objects described herein.

In a representative embodiment of the present invention, device capability information may be retrieved from an electronic device such as, for example, the mobile device 107 as extensible markup language (XML) formatted information, or as UAProf type formatted content. Although only two formats of retrieved device capability information are discussed herein, other formats are possible and are contemplated.

A management object (MO) in accordance with a representative embodiment of the present invention may be used to express device capability for a feature of an electronic device (e.g., mobile device 107) such as, for example, a firmware update feature. Such a MO may be provided as an element or part of a standards-defined device management object such as, for example, the "DevDetail" management object of the OMA DM standard. Such a standards-defined object may be part of a DM tree that is maintained by a device management server, such as the DM server 109, operating in cooperation with a device management client, such as the DM client 163 in the mobile device 107 in the exemplary mobile network 105 of FIG. 1. The current state/value of such a MO may be queried from the remote DM server 109 through the DM client 163. In a representative embodiment of the present invention, installed applications such as the installed applications 127 may provide their own MOs for device capabilities associated with the application 127 that may be incorporated into a management object such as the "DevDetail" management object of the OMA DM standard. In some representative embodiments of the present invention, such device capabilities may also be exported or retrieved as UAProf type formatted content.

Figure 2:
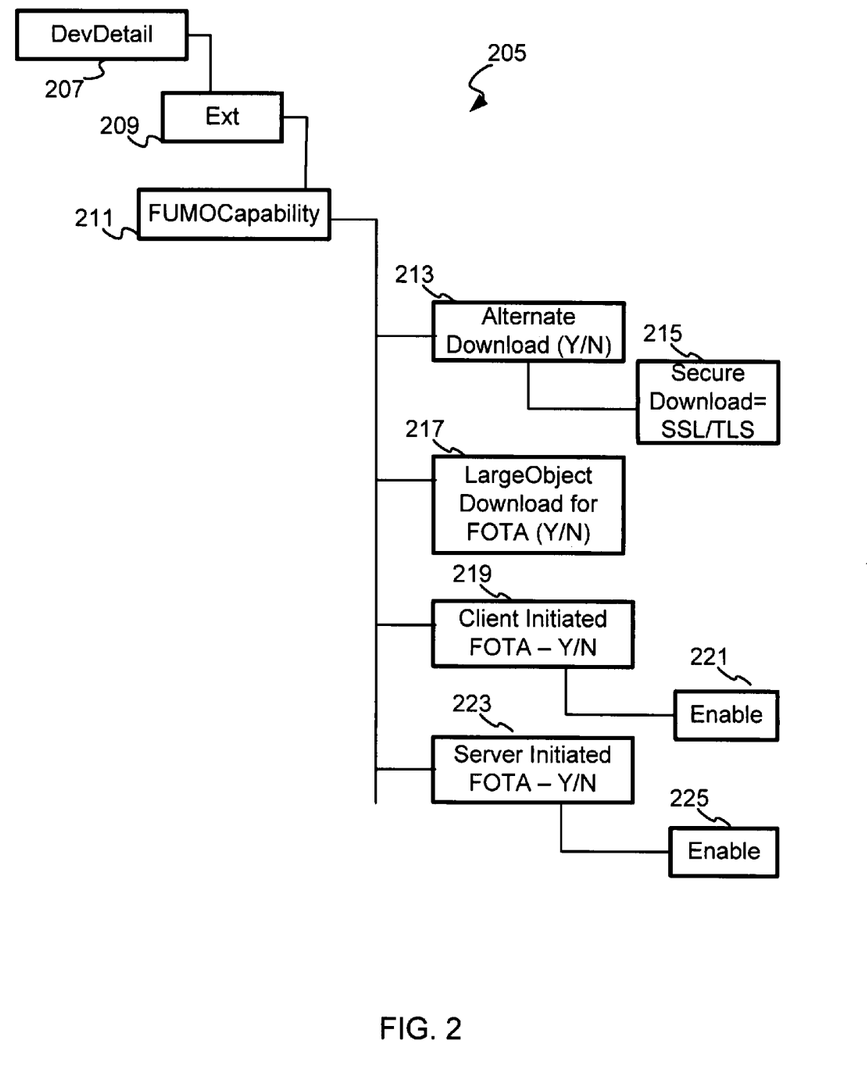
FIG. 2 is a perspective block diagram illustrating a section of an exemplary DM tree that may be managed by a DM client such as, for example, the DM client of FIG. 1, in accordance with a representative embodiment of the present invention.

FIG. 2 is a perspective block diagram illustrating a section of an exemplary DM tree 205 that may be managed by a DM client such as, for example, the DM client 163 of FIG. 1, in accordance with a representative embodiment of the present invention. As shown in the illustration of FIG. 2, OMA DM compatible FUMOCapability information 211 is stored as an element or part of a standard OMA DM "DevDetail" management object 207. In accordance with a representative embodiment of the present invention, the OMA DM compatible FUMOCapability information 211 may be manipulated as part of the DM tree 205, that may be managed by a DM client such as the DM client 163 in the mobile device 107 of FIG. 1, under the control of a DM server such as the DM server 109 of FIG. 1.

As shown in the exemplary illustration of FIG. 2, the FUMOCapability information 211 of the OMA "DevDetail" management object 207 may comprise a number of elements or parts including, for example', Alternate Download information 213 having a sub-node Secure Download information 215, Large Object Download for FOTA (firmware over-the-air) information 217, Client Initiated FOTA information 219 having a sub-node Enable information 221, and Server Initiated FOTA information 223 having a sub-node Enable information 225.

A representative embodiment of the present invention may provide support for the following exemplary features and information:

determination of which features of an application are not supported,     identification of optional features that are supported for applications and standard device feature domains,     determination of which available alternatives are "preferred mechanisms" for a feature domain,     determination of the resources employed by a feature domain such as, for example, firmware updates, and     identification of dependency on the presence of device drivers, if any, for applications, or services.

Figure 3:
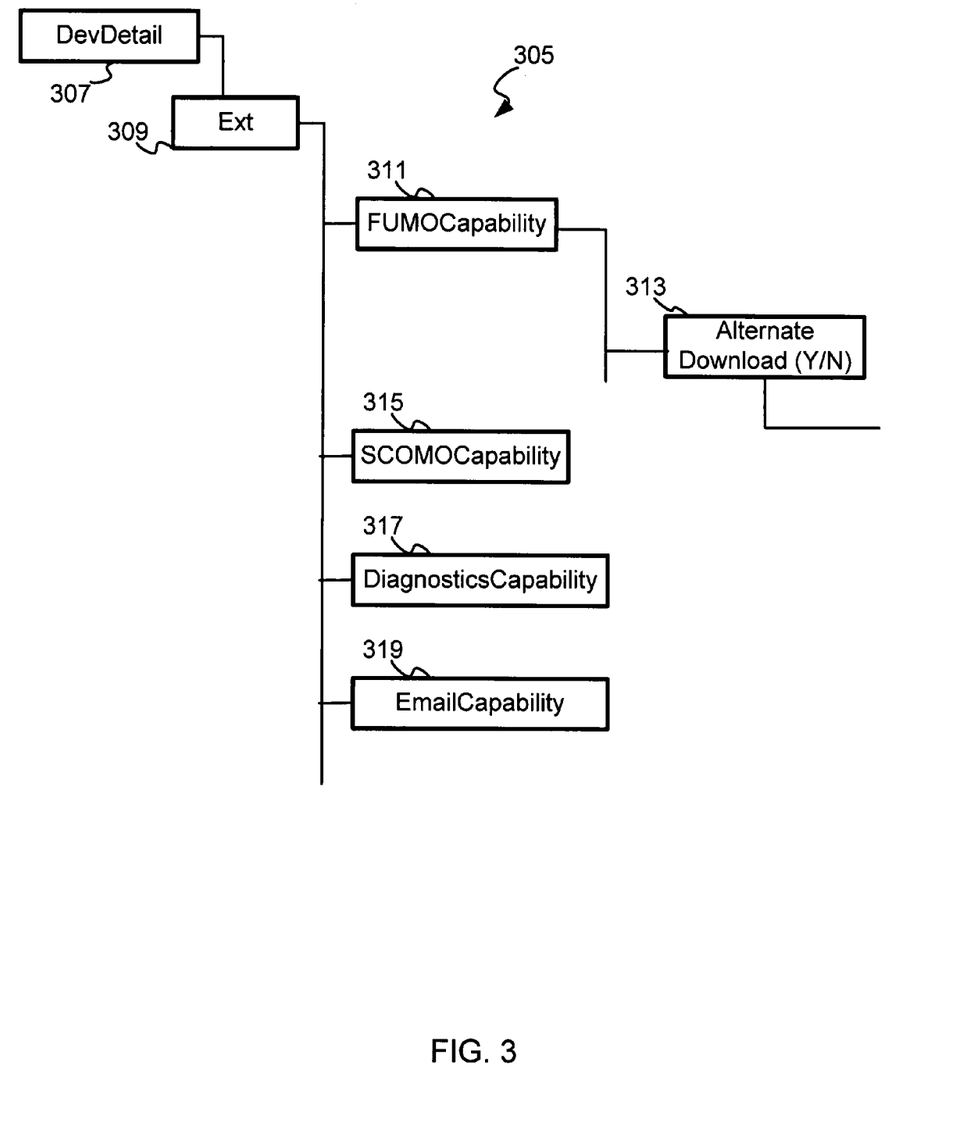
FIG. 3 depicts an exemplary DM tree under management of a DM client such as, for example, the DM client of the mobile device of FIG. 1, in accordance with a representative embodiment of the present invention.

FIG. 3 depicts an exemplary DM tree 305 under management of a DM client such as, for example, the DM client 163 of the mobile device 107 of FIG. 1, in accordance with a representative embodiment of the present invention. As illustrated in FIG. 3, the DM tree 305 supports device capability information as part of a standard DM tree MO which, in the example of FIG. 3 represents the "DevDetail" management object of the OMA DM standard. A management object in accordance with a representative embodiment of the present invention may be used to express device capability for a feature domain. Such a management object may be provided as part of a standards-defined management object such as the "DevDetail" MO of the OMA DM standard, and may be able to be queried. Installed applications may provide their own MOs that are incorporated into such a standard management object such as, for example, the "DevDetail" MO of the OMA DM standard.

In a representative embodiment of the present invention, device capabilities may also be exported or retrieved as UAProf type formatted content. A system operator may manage optional features associated with a feature domain, such as software component management feature domain. An electronic device such as the mobile device 107 of FIG. 1, for example, may have a device capability that the system operator (or, for example, an individual deployment) may decide not to use or enable. A representative embodiment of the present invention provides the system operator the ability to enable/disable a feature or device capability that the electronic device possesses by default. In this manner, the device capability information of an electronic device such as the mobile device 107, for example, may be queried via the associated MOs. The ability to query device capability information either locally or remotely, such as via a DM server interacting with a DM client, permits device capabilities to be managed both locally and remotely.

In a representative embodiment of the present invention, an electronic device such as the mobile device 107 of FIG. 1, for example, may support several user agents or applications. For example, user agents for firmware update over-the-air (FOTA), push-to-talk over cellular (PoC), instant messaging (IM), and web browsing, to name only a few, may be employed in an electronic device such as the mobile device 107. Each of these user agents may be associated with their own management objects (or sub-nodes) containing device capability, information. In addition, in some representative embodiments of the present invention, device capability information may be supported for applications that are downloaded and installed in the mobile device 107 such as, for example, wirelessly over-the-air. In such instances, newly installed applications may provide their own capability information that is incorporated into an existing DM tree under the control of a DM server such as the DM server 109 of FIG. 1, by a DM client such as the DM client 163 of FIG. 1. Such added device capability information may also be subsequently retrieved or managed, as described above.

Although the above examples primarily address the use of the OMA DM "DevDetail" management object, illustrated in FIG. 3, as the node to which device capability management object sub-nodes for features (such as, for example, FUMO) and applications (such as, for example, Email) may be added, upon reading this disclosure one of skill in the art will recognize that this does not represent a specific limitation of the present invention, and that other standardized management objects may be used for similar purposes and in a similar fashion.

In a representative embodiment of the present invention, the FUMO related nodes are typically used to store FUMO-related device capabilities and options, the SCOMO related nodes are used to also provide SCOMO related device capabilities and options, and so forth. Thus, individual applications may each have their own MOs, and these MOs may be used to provide device capability information associated with those applications.

Aspects of the present invention may be found in a handheld electronic device comprising non-volatile memory having stored therein one or both of firmware and software, and at least one processor operably coupled to the non-volatile memory. The at least one processor may, during operation, at least wirelessly receive, from a remote server via a communication network, device capability information according to a device management protocol standard, and may store the device capability information as a sub-node of a standards-defined device management object in a device management tree in the non-volatile memory. The at least one processor may also enable or disable functionality of the handheld electronic device based upon the device capability information.

In a representative embodiment of the present invention, the handheld electronic device may comprise one of a mobile handset and a cellular phone, and may comprise one of a personal digital assistant and a personal computer. The received device capability information may be expressed as extensible markup language (XML). The device capability information may be stored as a sub-node or part of a device management object defined in the Open Mobile Alliance (OMA) Device Management (DM) Version 1.2 or later protocol specification. Storing the device capability information may comprise adding an application-related sub-node to a standards-defined device management object in the device management tree. The non-volatile memory may comprise flash type memory.

In a representative embodiment of the present invention, the at least one processor may, during operation, at least wirelessly send to a remote server via the communication network, device capability information from the device management tree. The at least one processor may also, during operation, at least wirelessly download update information used to update the one or both of firmware and software. The communication network may comprise a public communication network, and the device capability information may be accessible using an Open Mobile Alliance (OMA) UAProf based device profile, and enabling or disabling functionality of the handheld electronic device may comprise enabling or disabling functionality of a portion of the one or both of firmware and software. The management object set or modified by storing device capability information may be initially set by a manufacturer of the handheld electronic device.

Additional aspects of the present invention may be seen in a computer-readable storage comprising a plurality of code sections for operating a handheld electronic device in a device management network. The plurality of code sections may have stored therein instruction code executable by a processor for causing the processor to perform a method comprising wirelessly receiving, via the device management network, device capability information associated with functionality of the handheld electronic device, the device capability information encoded to be compatible with a device management protocol standard. Such a method may also comprise storing device capability information associated with the updated functionality in a non-standard sub-node of a standards-defined device management object of a device management tree in non-volatile memory of the handheld electronic device. In addition, the method may comprise enabling or disabling functionality of the handheld electronic device based upon the associated device capability information. The code sections may further comprise instruction code executable by the processor for causing the processor to wirelessly receive information for updating instruction code in the computer-readable storage to update functionality of the handheld electronic device.

In various representative embodiments of the present invention, the handheld electronic device may comprise one of a mobile handset and a cellular phone. The handheld electronic device may also comprise one of a personal digital assistant and a personal computer. The received device capability information may be communicated as extensible markup language (XML), and the device management protocol standard may be the device management protocol referred to as the Open Mobile Alliance (OMA) Device Management (DM) Version 1.2 or later protocol. The non-volatile memory may comprise flash type memory.

In a representative embodiment of the present invention, the code sections may further comprise instruction code executable by the processor for causing the processor to wirelessly send to a remote server via the device management network, device capability information from the device management tree. The code sections may also comprise instruction code executable by the processor for causing the processor to wirelessly download update information used to update the one or both of firmware and software. The device management network may comprise a public communication network, and the device capability information may be accessible using an Open Mobile Alliance (OMA) UAProf based device profile. Storing the device capability information may comprise adding an application-related non-standard sub-node from a standards-defined device management object in the device management tree.

Yet other aspects of the present invention may be observed in a system for managing device capability information in a plurality of handheld electronic devices. Such a system may comprise at least one server comprising at least one interface enabling communication with the plurality of handheld electronic devices via a wireless communication network, and at least one processor operably coupled to the at least one interface and at least one memory containing device capability information and information for updating executable code in the plurality of handheld electronic devices. The at least one processor may function during operation to, among other things, determine functionality for one of the plurality of handheld electronic devices, based upon input from a user, and store device capability information associated with the functionality for the one of the plurality of handheld electronic devices in the at least one memory. The at least one processor may also function to transmit, to the one of the plurality of handheld electronic devices via the wireless communication network in accordance with a device management protocol standard. The device capability information may be associated with the functionality for the one of the plurality of handheld electronic devices, and the transmitted device capability information may be arranged to cause updating of a non-standard sub-node of a standards-defined device management object in a device management tree in memory of the one of the plurality of handheld electronic devices.

In a representative embodiment of the present invention, the plurality of handheld electronic devices may comprise one of a mobile handset and a cellular phone, and may comprise one of a personal digital assistant and a personal computer. Transmitted device capability information may be communicated as extensible markup language (XML), and the device management protocol standard may be the device management protocol referred to as the Open Mobile Alliance (OMA) Device Management (DM) Version 1.2 or later protocol. The at least one processor may function during operation to, among other things, receive device capability information from the device management tree of the one of the plurality of handheld electronic devices. The at least one processor may also function during operation to, among other things, download update information used to update, one or both of firmware and software to the one of the plurality of handheld electronic devices. The communication network may comprise a public communication network, and the device capability information may be arranged according to an Open Mobile Alliance (OMA) UAProf based device profile. The transmitted device capability information may be arranged to cause adding of a non-standard sub-node of a standards-defined device management object in the device management tree in memory of the one of the plurality of handheld electronic devices.

Additional aspects of the present invention may be found in a handheld electronic device comprising at least one memory having stored therein one or both of firmware and software. Changes in functionality of the handheld electronic device may be enabled by remotely updating the one or both of firmware and software, and new device functionality may be enabled by remotely provisioning device capability information associated with the new device functionality as additional management objects in a standards-defined device management tree. The handheld electronic device may comprise a cellular phone, and the device management tree may be in accordance with a device management protocol referred to as the Open Mobile Alliance (OMA) Device Management (DM) Version 1.2 or later protocol.

Yet other aspects of the present invention may be observed in a system for managing device capability in mobile electronic devices. Such a system may comprise at least one server communicatively coupled to at least one mobile electronic device. Device capability information resident in memory in the at least one mobile electronic device may enable or disable functionality of the at least one mobile electronic device, and the device capability information may be initially provisioned and subsequently managed using management objects based on a device management protocol referred to as the Open Mobile Alliance (OMA) Device Management (DM) Version 1.2 or later protocol standard. The at least one mobile electronic device may comprise a cellular phone, and the initial provisioning of device capability information in the at least one mobile electronic device may be performed by a manufacturer of the at least one mobile electronic device. Functionality of the at least one mobile device may be enhanced by remotely updating, from the at least one server, one or both or firmware and software in the memory of the at least one mobile electronic device, and the enhanced functionality of the at least one mobile electronic device may be enabled by new management objects provisioned, by the at least one server, into a device management tree in the memory.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A handheld electronic device comprising:
  non-volatile memory having stored therein one or both of firmware and software;
  at least one processor operably coupled to the non-volatile memory, wherein the at least one processor, during operation, at least:
  wirelessly receives, from a remote server via a communication network, device capability information associated with an application resident on the electronic device according to a device management protocol standard;
  stores the device capability information as a non-standard sub-node of a defined standard device management object in a device management tree in the non-volatile memory, wherein the non-standard sub-node is logically associated with the application; and
  enables or disables the resident application, a previously enabled feature of the resident application, and functionality of the handheld electronic device based upon the device capability information,
  wherein the device capability information includes quantification and identification of handheld electronic device resources used by the resident application, and an indication associated with the resident application being a standard application.

2. The handheld electronic device according to claim 1, wherein the handheld electronic device comprises one of a mobile handset and a cellular phone.

3. The handheld electronic device according to claim 1, wherein the handheld electronic device comprises one of a personal digital assistant and a personal computer.

4. The handheld electronic device according to claim 1, wherein the received device capability information is expressed as extensible markup language (XML).

5. The handheld electronic device according to claim 1, wherein the device capability information is stored as a non-standard sub-node or part of a device management object defined in the Open Mobile Alliance (OMA) Device Management (DM) Version 1.2.

6. The handheld electronic device according to claim 1, wherein storing the device capability information comprises adding an application-related non-standard sub-node to a defined standard device management object in the device management tree.

7. The handheld electronic device according to claim 1, wherein the nonvolatile memory comprises flash type memory.

8. The handheld electronic device according to claim 1, wherein the at least one processor, during operation, at least:
  wirelessly sends to the remote server via the communication network, device capability information from the device management tree, the remote server being a device management (DM) server interacting with a DM client stored in the non-volatile memory, the device management tree being under management of the DM client.

9. The handheld electronic device according to claim 1, wherein the at least one processor, during operation, at least:
  wirelessly downloads update information used to update the one or both of firmware and software.

10. The handheld electronic device according to claim 1, wherein the communication network comprises a public communication network.

11. The handheld electronic device according to claim 1, wherein the device capability information is accessible using an Open Mobile Alliance (OMA) UAProf based device profile.

12. The handheld electronic device according to claim 1, wherein enabling or disabling functionality of the handheld electronic device comprises enabling or disabling functionality of a portion of the one or both of firmware and software.

13. The handheld electronic device according to claim 1, wherein the management object set or modified by storing device capability information is initially set by a manufacturer of the handheld electronic device.

14. A non-transitory computer-readable storage medium comprising a plurality of code sections for operating a handheld electronic device in a device management network, the plurality of code sections having stored therein instruction code executable by a processor for causing the processor to perform a method comprising:
  wirelessly receiving, via the device management network, device capability information including indications of whether features in the electronic device are enabled and which and how much resources associated with an application resident on the electronic device are used by the application, the device capability information encoded to be compatible with a device management protocol standard;
  storing device capability information associated with the updated functionality in a non-standard sub-node of a defined standard device management object of a device management tree in non-volatile memory of the handheld electronic device, wherein the non-standard sub-node is logically associated with the application; and
  enabling or disabling the resident application, a previously enabled feature of the resident application, and functionality of the handheld electronic device based upon the associated device capability information,
  wherein the device capability information includes quantification and identification, of handheld electronic device resources used by the resident application, and an indication associated with the resident application being a standard application.

15. The non-transitory computer-readable storage medium according to claim 14, wherein the code sections further comprise instruction code executable by the processor for causing the processor to:
  wirelessly receive information for updating instruction code in the computer-readable storage to update functionality of the handheld electronic device.

16. The non-transitory computer-readable storage medium according to claim 14, wherein the handheld electronic device comprises one of a mobile handset and a cellular phone.

17. The non-transitory computer-readable storage medium according to claim 14, wherein the handheld electronic device comprises one of a personal digital assistant and a personal computer.

18. The non-transitory computer-readable storage medium according to claim 14, wherein the received device capability information is communicated as extensible markup language (XML).

19. The non-transitory computer-readable storage medium according to claim 14, wherein the device management protocol standard is the device management protocol referred to as the Open Mobile Alliance (OMA) Device Management (DM) Version 1.2.

20. The non-transitory computer-readable storage medium according to claim 14, wherein the nonvolatile memory comprises flash type memory.

21. The non-transitory computer-readable storage medium according to claim 14, wherein the code sections further comprise instruction code executable by the processor for causing the processor to:
wirelessly send to a remote server via the device management network, device capability information from the device management tree.

22. The non-transitory computer-readable storage medium according to claim 14, wherein the code sections further comprise instruction code executable by the processor for causing the processor to:
wirelessly download update information used to update the one or both of firmware and software.

23. The non-transitory computer-readable storage medium according to claim 14, wherein the device management network comprises a public communication network.

24. The non-transitory computer-readable storage medium according to claim 14, wherein the device capability information is accessible using an Open Mobile Alliance (OW) UUAProf based device profile.

25. The non-transitory computer-readable storage medium according to claim 14, wherein storing the device capability information comprises adding an application-related non-standard sub-node from a defined standard device management object in the device management tree.

26. A system for managing device capability information in a plurality of handheld electronic devices, the system comprising: at least one server comprising:
at least one interface enabling communication with the plurality of handheld electronic devices via a wireless communication network;
at least one processor operably coupled to the at least one interface and at least one memory containing device capability information associated with an application resident on the electronic device and information for updating executable code in the plurality of handheld electronic devices, the at least one processor functioning during operation to, among other things:
retrieve device capability information from one of the plurality of handheld electronic devices to determine-functionality for the one of the plurality of handheld electronic devices, based upon input from a user, and
enablement or disablement of the resident application and a previously enabled feature thereof based upon the device capability information;
store device capability information associated with the functionality for the one of the plurality of handheld electronic devices, and the enablement or disablement of the resident application and the previously enabled feature thereof in the at least one memory; and
transmit, to the one of the plurality of handheld electronic devices via the wireless communication network in accordance with a device management protocol standard, the device capability information associated with the functionality for the one of the plurality of handheld electronic devices, the enablement or disablement of the resident application and the previously enabled feature thereof, wherein the transmitted device capability information is arranged to cause updating of a non-standard sub-node of a defined standard device management object in a device management tree in memory of the one of the plurality of handheld electronic devices, wherein the non-standard sub-node is logically associated with the application,
wherein the device capability information includes quantification and identification of handheld electronic device resources used by the resident application, and an indication associated with the resident application being a standard application.

27. The system according to claim 26, wherein the plurality of handheld electronic devices comprises one of a mobile handset and a cellular phone.

28. The system according to claim 26, wherein the plurality of handheld electronic devices comprises one of a personal digital assistant and a personal computer.

29. The system according to claim 26, wherein transmitted device capability information is communicated as extensible markup language (XML).

30. The system according to claim 26, wherein the device management protocol standard is the device management protocol referred to as the Open Mobile Alliance (OMA) Device Management (DM) Version 1.2.

31. The system according to claim 26, wherein the at least one processor functions during operation to, among other things:
receive device capability information from the device management tree of the one of the plurality of handheld electronic devices.

32. The system according to claim 26, wherein the at least one processor functions during operation to, among other things:
download update information used to update one or both of firmware and software to the one of the plurality of handheld electronic devices.

33. The system according to claim 26, wherein the communication network comprises a public communication network.

34. The system according to claim 26, wherein the device capability information is arranged according to an Open Mobile Alliance (OMA) UAProf based device profile.

35. The system according to claim 26, wherein the transmitted device capability information is arranged to cause adding of a non-standard sub-node of a defined standard device management object in the device management tree in memory of the one of the plurality of handheld electronic devices.

36. A handheld electronic device comprising:
at least one memory having stored therein one or both of firmware and software;
wherein an application resident on the electronic device and a previously enabled feature thereof, and changes in functionality of the handheld electronic device are enabled and disabled by remotely updating the one or both of firmware and software; and
wherein an application resident on the electronic device and a previously enabled feature thereof, and new device functionality is enabled or disabled by remotely provisioning device capability information associated with the new device functionality as additional management objects associated with the application resident on the electronic device in a defined standard device management tree wherein the non-standard sub-node is logically associated with the application, and wherein the device c capability information includes quantification and identification of handheld electronic device resources used by the resident application, and an indication associated with the resident application being a standard application.

37. The handheld electronic device according to claim 36, wherein the handheld electronic device comprises a cellular phone.

38. The handheld electronic device according to claim 36, wherein the device management tree is in accordance with a device management protocol referred to as the Open Mobile Alliance (OMA) Device Management (DM) Version 1.2.

39. A system for managing device capability in mobile electronic devices, the system comprising at least one server communicatively coupled to at least one mobile electronic device, wherein device capability information resident in memory in the at least one mobile electronic device enables or disables functionality of the at least one mobile electronic device, an application resident on the electronic device, and a previously enabled feature of the resident application, and wherein the device capability information associated with the application resident on the electronic device is stored in a non-standard sub-node of a tree which is logically associated with the application is initially provisioned and subsequently managed using management objects based on a device management protocol referred to as the Open Mobile Alliance (OM) Device Management (DM) Version 1.2, wherein the device capability information includes quantification and identification of handheld electronic device resources used by the resident application, and an indication associated with the resident application being a standard application.

40. The system according to claim 39, wherein the at least one mobile electronic device comprises a cellular phone.

41. The system according to claim 39, wherein the initial provisioning of device capability information in the at least one mobile electronic device is performed by a manufacturer of the at least one mobile electronic device.

42. The system according to claim 39, wherein functionality of the at least one mobile device is enhanced by remotely updating, from the at least one server, one or both or firmware and software in the memory of the at least one mobile electronic device, and wherein the enhanced functionality of the at least one mobile electronic device is enabled by new management objects provisioned, by the at least one server, into a device management tree in the memory.

* * * * *

UNITED STATES PATENT AND TRADEMARK OFFICE
CERTIFICATE OF CORRECTION

PATENT NO. : 7,974,613 B1
APPLICATION NO. : 11/707505
DATED : July 5, 2011
INVENTOR(S) : Uma Shanker et al.

It is certified that error appears in the above-identified patent and that said Letters Patent is hereby corrected as shown below:

In column 13, lines 36-37, in Claim 24, delete "(OW) UUAProf" and insert -- (OMA) UAProf --, therefor.

In column 13, lines 57-58, in Claim 26, delete "determine-functionality" and insert -- determine functionality --, therefor.

In column 15, line 7, in Claim 36, after "device" delete "c".

In column 16, line 6, in Claim 39, delete "(OM)" and insert -- (OMA) --, therefor.

Signed and Sealed this
Seventeenth Day of January, 2012

David J. Kappos
*Director of the United States Patent and Trademark Office*